Patented July 25, 1939

2,167,319

UNITED STATES PATENT OFFICE 2,167,319

PROCESS FOR THE MANUFACTURE OF POLYSULPHIDES OF ORGANIC BASES AND OF THEIR SOLUTIONS

Andreas von Antropoff and Johannes Friedrichsen, Bonn-on-the-Rhine, Germany, assignors to the firm of Carl Blank K. G., Bonn-on-the-Rhine, Germany No Drawing. Application May 10, 1938, Serial No. 207,162. In Germany June 28, 1937

16 Claims. (Cl. 167—65)

For various purposes of technology and medicine, it is important to introduce elementary sulphur into the surface layer of organic, animal and vegetable tissues and other materials. Particularly in dermatotherapy, for the treatment of certain skin diseases, for example diseases due to fungi, and seborrhoeic eczema, elementary sulphur has been employed for a considerable time in the form of sulphur ointments, sulphur soaps, sulphur shaking mixtures and so forth. For the sulphur to act, it must be brought into the most intimate contact possible with the skin, and the action is stronger, the more it is possible to cause the sulphur to penetrate into the depth of the skin. It is clear, however, that the particles of solid, elementary sulphur which are contained in sulphur ointments and sulphur soaps manufactured with precipitated sulphur, and also in colloidal suspensions of sulphur, can never diffuse into the skin. For the sulphur to be able to do this, it must be brought into contact with the skin in a true dissolved form, i. e. in a molecular dispersed distribution, and the solvent must have the property of readily penetrating the skin with the dissolved sulphur. In addition, the solvent must be harmless and capable of being washed out with water. As no solvent for elementary sulphur has been found which possesses the desired properties and dissolves the sulphur in a sufficient quantity, endeavours have long been made to manufacture sulphur compounds which are soluble in suitable solvents and exert the action of free sulphur. The difficulty is, however, that such compounds are either only very slightly soluble in the solvents coming into consideration, or the sulphur is so firmly combined that it cannot act as free sulphur.

Compounds which have the desired properties are the ammonium polysulphides which are obtained in aqueous solutions when sulphur is dissolved in a solution of ammonium sulphide. In this case, up to 4 atoms of sulphur are absorbed by 1 sulphide molecule and these atoms are separated out again on diluting with water or by oxidation by the oxygen of the air or by the action of weak acids. On bringing the polysulphide solution into contact with the skin it penetrates the skin and the sulphur separates out in the skin by the acid reaction of the latter, and also by the action of the air and of water. Practical application, however, is prevented by the poor durability of the solution, the offensive odour and the keratolytic action.

In order to obtain a durable polysulphide preparation, fats have already been saponified with sodium polysulphide. The resulting solid soaps contain sodium polysulphide. The desired object is not, however, attained, because the soap must be dissolved in water before being brought into contact with the skin, the polysulphide sulphur being thereby separated out in a colloidal form. A true solution of the sulphur or of a sulphur compound does not, therefore, come into contact with the skin, but only a colloidal suspension, the sulphur particles whereof cannot by any means come into a particularly intimate contact with the skin, and, therefore can never penetrate the skin.

In order now to utilise the excellent properties of polysulphides, the problem arose of preparing polysulphides from which durable liquid solutions may be made, (1) In which the polysulphide is contained undecomposed, (2) The odour of which does not prevent use, (3) The basicity of which does not substantially exceed the pH value 9, (4) Which have no keratolytic action, and (5) The solvent of which is harmless, is well absorbed by the skin, is miscible with water and can be washed out by means of the latter.

Polysulphides of the various alkylamines may be readily prepared. As compared with ammonium polysulphide, however, they possess disadvantages, their odour being still more unbearable and the basicity being greater. The basicity of other derivatives of ammonia, such as for example of glycocoll, of aniline, of dimethylaniline or of pyridine is however too slight, so that no polysulphides are formed at all. It has been found, however, that the polysulphides may be obtained under certain conditions from the hydroxyalkylamines, particularly trihydroxyethylamine, which forms the principal constituent of commercial triethanolamine, and that these possess all the desired properties. In particular, durable solutions can be made with solvents or diluents suitable for use.

The formation of the polysulphide of triethanolamine by treatment with sulphur and hydrogen sulphide is prevented by the high viscosity of the triethanolamine. This prevents thorough mixing and during the operation, the reaction mixture becomes continually thicker until it sets. It has been possible to overcome this difficulty in two ways:—

(1) By raising the working temperature to 60–80° C., on the one hand, the viscosity is reduced so that the reaction proceeds quickly, and on the other hand at this temperature no decomposition or other disturbing auxiliary reaction occurs. Accordingly the triethanol-ammonium polysulphide is obtained by suspending in triethanolamine the necessary quantity of sulphur in a finely divided form and passing in hydrogen sulphide at about 70° C. until the sulphur has dissolved. Temperatures between 50° C. and 100° C. may be employed. Any excess of hydrogen sulphide, which may be detected by the odour, can be removed by exhausting. According to the quantity of sulphur added, polysulphides of lower or higher sulphur content and a solution diluted more or less by excess of triethanolamine may be obtained.

(2) It is also possible to operate at room temperature if the viscosity is reduced by the addition of water. In this case, it must be borne in mind that the water has a hydrolysing action. An excessively large quantity of water, therefore, prevents the formation of polysulphide or decomposes the resulting polysulphide with the separation of sulphur. There is, however, a quantity of water which may be added without preventing the formation of polysulphide in the necessary concentration and which at the same time adequately reduces the viscosity. It has been found most advantageous to dilute one mol of triethanolamine with 2 mols of water. By passing in hydrogen sulphide at room temperature and with this addition of water, 1 gram atom of sulphur is readily dissolved per mol of triethanolamine. In the case of greater dilution, the quantity of sulphur is completely dissolved only at an elevated temperature, but a portion is precipitated again on cooling.

In place of water or triethanolamine, a liquid soap, preferably a triethanolamine soap, may advantageously be employed for dilution. Semi-liquid soft soaps, however, also come into consideration. Dilution with ethyl alcohol, methyl alcohol and glycerine is possible with the simultaneous addition of water.

Experiments with mono-ethanolamine, diethanolamine and with mixed hydroxyalkylamines and alkyl-hydroxyalkylamines have showed that the latter behave in a similar manner to triethanolamine and may be used similarly, but it has also been observed that mono-ethanolamine without the introduction of hydrogen sulphide is capable of dissolving sulphur when hot and also of forming solutions which are stable at the ordinary temperature. With mono-ethanolamine and other primary and secondary aliphatic amines which are not too volatile the sulphur is dissolved under the formation of hydrogen sulphide in situ.

The solutions of hydroxyalkylammonium polysulphides, particularly of triethanolammonium polysulphide, with triethanolamine, water or liquid soap or their mixtures as solvent, prepared by the process described, form clear, durable reddish-brown liquids having a very slight odour, without keratolytic action and having a pH value corresponding to a mild toilet soap. The polysulphide sulphur is separated out immediately by water, air and by weak acids such as, for example, the acid reaction of the epidermis.

In order to make the solutions more durable for storage with access of air, a sulphite, preferably triethanolammonium sulphite obtained by passing sulphur dioxide through triethanolamine may be employed.

Examples (1) 32 grams of flowers of sulphur are suspended in 150 grams of commercial triethanolamine. Then at about 70° C., hydrogen sulphide is passed in until all the sulphur has dissolved. There is obtained a clear, reddish-brown liquid consisting substantially of a solution of the hydroxy-alkyl-ammonium polysulphide in excess of triethanolamine.

(2) 36 grams of water are added to a suspension of 32 grams of flowers of sulphur in 150 grams of triethanolamine. Thereupon hydrogen sulphide is passed in at room temperature until the sulphur has completely dissolved. Any excess of hydrogen sulphide, which may be detected by the odour, is removed by exhausting. The product is a concentrated solution of hydroxyalkylammonium polysulphides in a mixture of triethanolamine and water.

(3) 15 grams of the polysulphide solution prepared according to (1) are mixed with 15 grams of triethanolamine. 100 grams of triethanolamine soap are added to the mixture. The product is a solution of hydroxyalkylammonium polysulphides diluted with triethanolamine and liquid triethanolamine soap.

(4) The process is carried out as in (3) with the difference that instead of 15 grams of the product obtained according to (1) 17 grams of the solution obtained according to (2) are employed. The product corresponds to that obtained according to (3) but with more water.

(5) The process is carried out as in (3) and (4) except that the added triethanolamine is replaced by the same quantity of triethanolammonium sulphite. The latter is obtained by neutralising triethanolamine with sulphur dioxide.

We claim:

1. Process for the manufacture of polysulphides of organic bases which comprises contacting a mixture of a hydroxyalkylamine and sulphur in the presence of hydrogen sulphide while maintaining the mixture in a fluid state.

2. Process as defined in claim 1 in which the mixture of sulphur and hydroxyalkylamine is maintained in fluid state by heating it to a temperature of from 50° C. to 100° C.

3. Process as defined in claim 1 in which the hydroxyalkylamine is trihydroxyethylamine and in which the mixture of sulphur and trihydroxyethylamine is maintained at a temperature of from 60° C. to 80° C. while being contacted with the hydrogen sulphide.

4. Process as defined in claim 1 in which the mixture of sulphur and hydroxyalkylamine is maintained fluid by the addition of a diluent.

5. Process as defined in claim 1 in which the mixture of sulphur and hydroxyalkylamine is maintained fluid during treatment with hydrogen sulphide by dilution with water.

6. Process as defined in claim 1 in which the hydroxyalkylamine is triethanolamine and in which the mixture of sulphur and triethanolamine is maintained fluid during treatment with hydrogen sulphide by dilution with water.

7. Process which comprises contacting hydrogen sulphide with a mixture of sulphur, triethanolamine and water containing about 1 mol of the triethanolamine to about 2 mols of water.

8. As a new product a hydroxyalkylammonium polysulphide.

9. As a new product a composition comprising a hydroxyalkylammonium polysulphide and a diluent.

10. As a new product a composition comprising a hydroxyalkylammonium polysulphide and a diluent of the group consisting of hydroxyalkylamines, liquid soaps, alcohols, glycerine and water.

11. As a new product triethanolammonium polysulphide.

12. As a new product a composition comprising triethanolammonium polysulphide and a diluent.

13. As a new product a composition comprising triethanolammonium polysulphide and water.

14. As a new product a composition comprising triethanolammonium polysulphide, triethanolamine and water.

15. As a new product a composition comprising triethanolammonium polysulphide, triethanolamine, water and a triethanolamine soap.

16. As a new product a composition comprising triethanolammonium polysulphide, water and triethanolammonium sulphite.

ANDREAS von ANTROPOFF.
JOHANNES FRIEDRICHSEN.